Patented Feb. 14, 1939

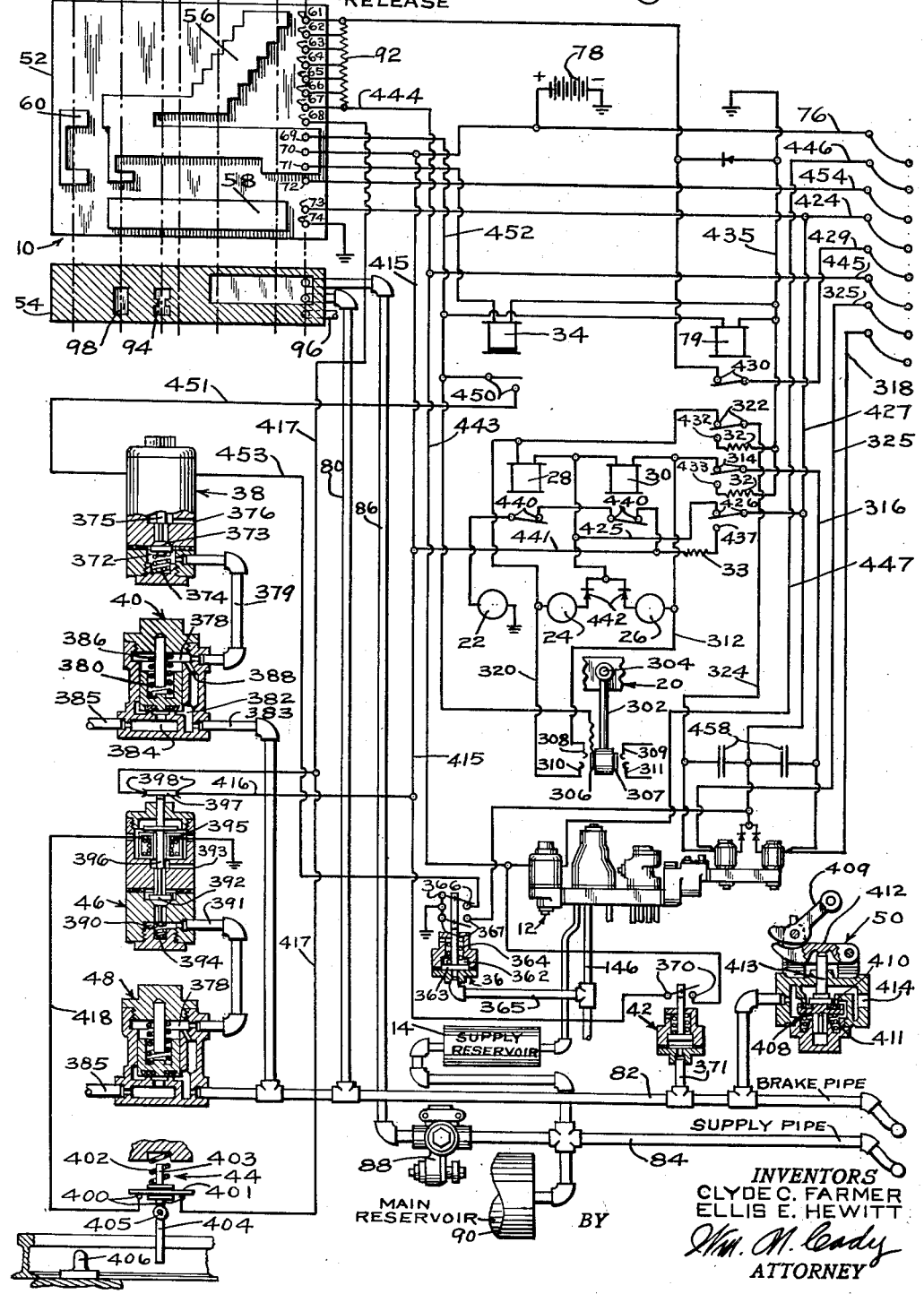

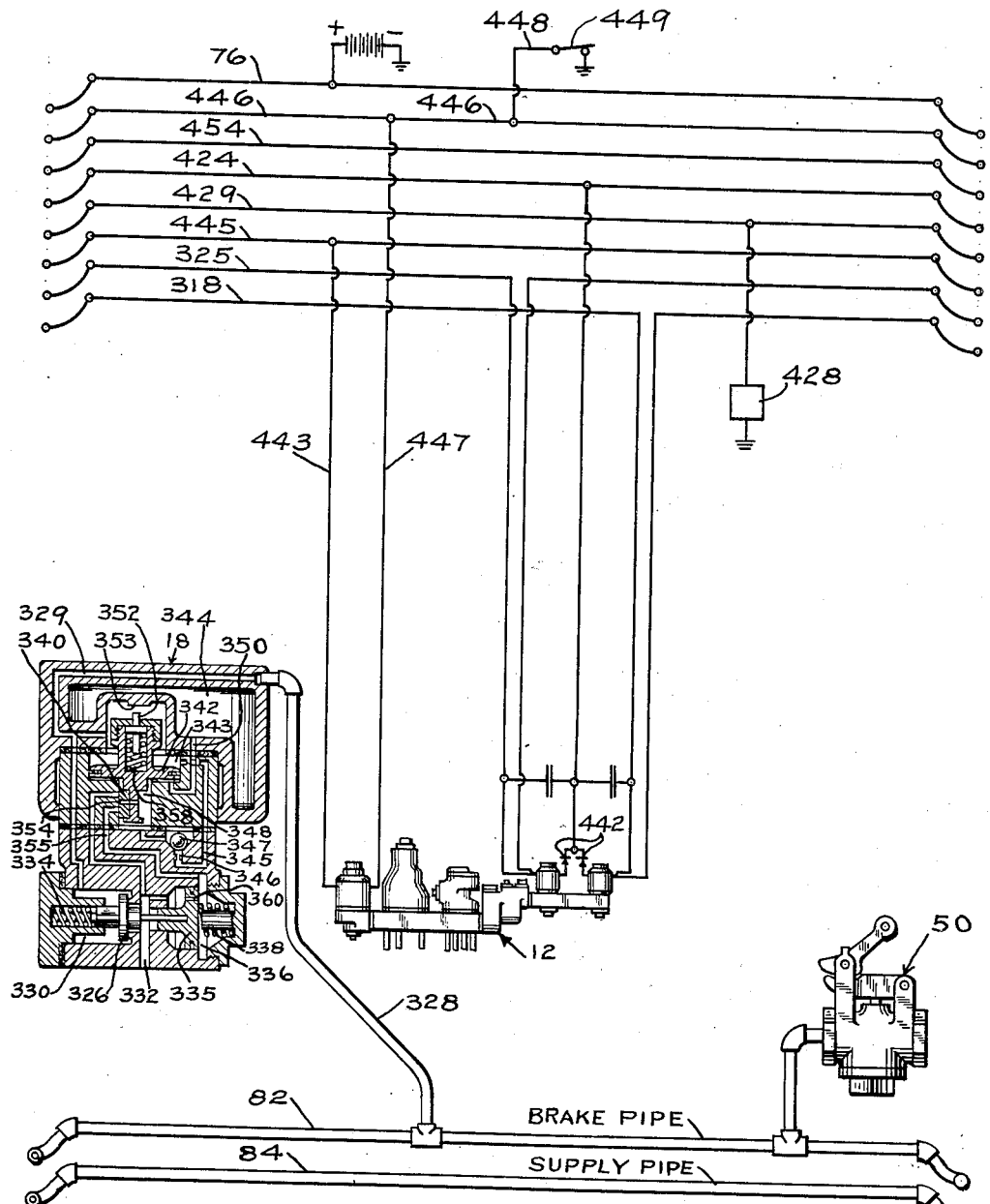

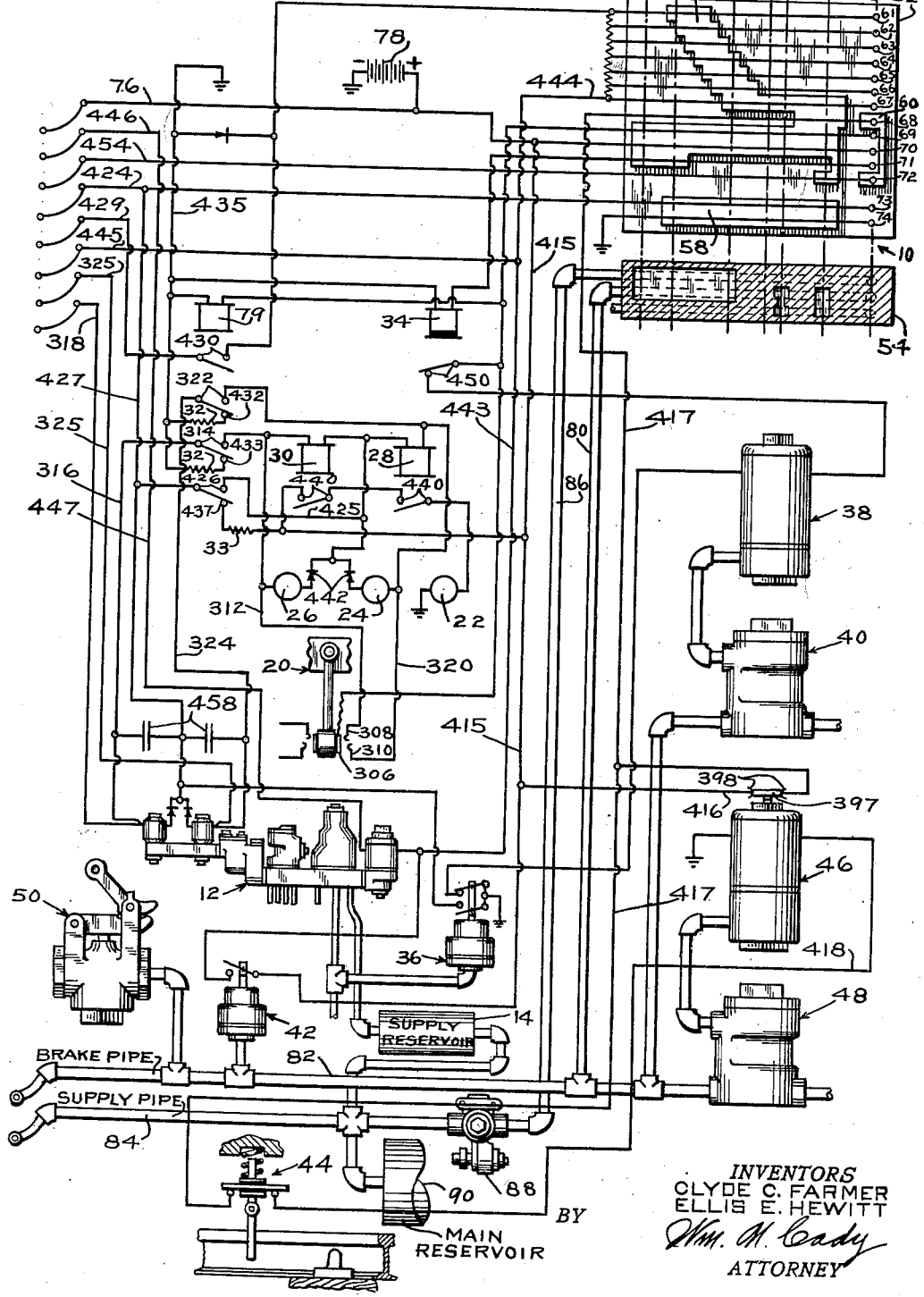

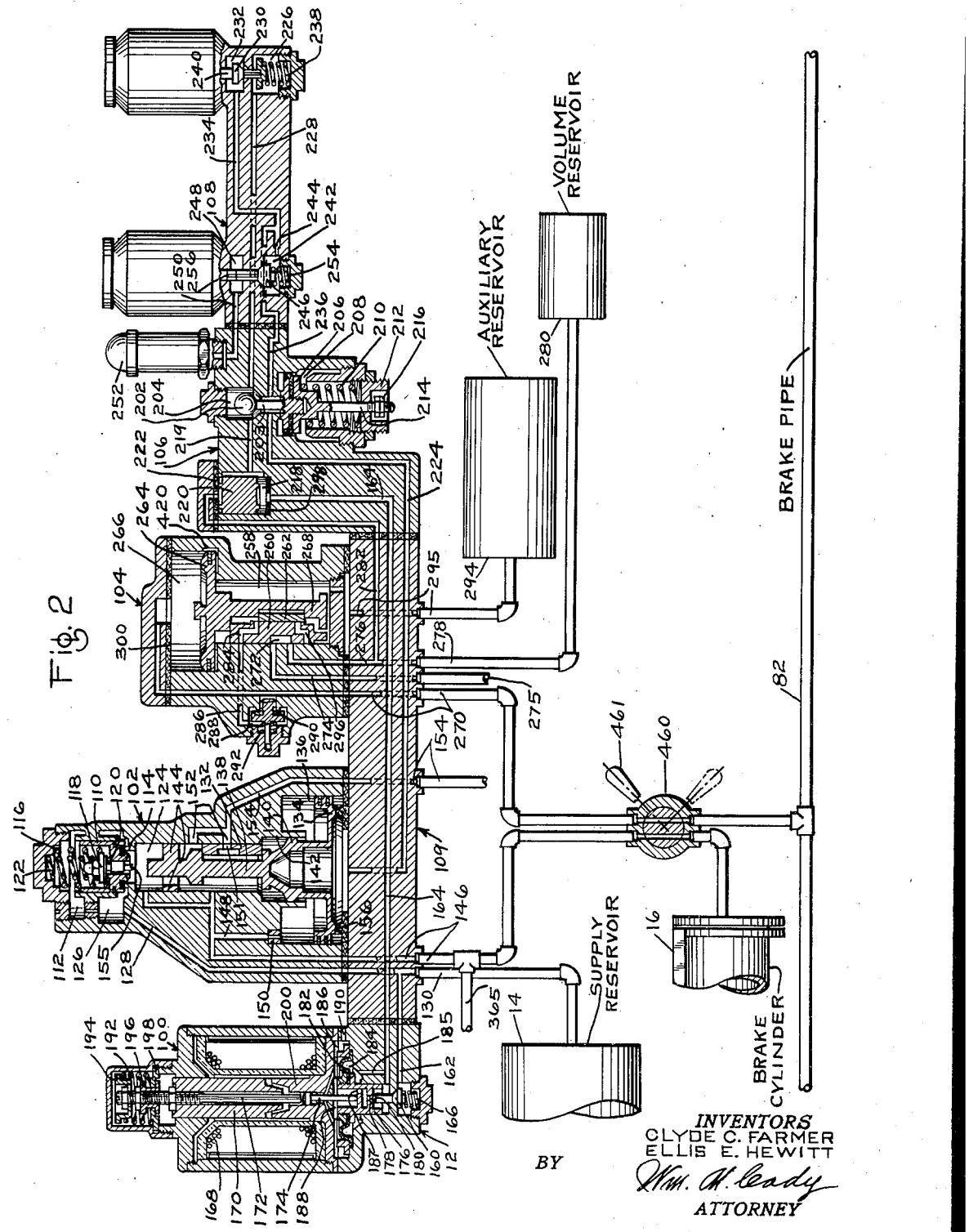

2,147,297

UNITED STATES PATENT OFFICE 2,147,297

ELECTROPNEUMATIC BRAKE EQUIPMENT

Clyde C. Farmer, Pittsburgh, and Ellis E. Hewitt, Edgewood, Pa., assignors to The Westinghouse Air Brake Company, Wilmerding, Pa., a corporation of Pennsylvania Application May 18, 1934, Serial No. 726,324

35 Claims. (Cl. 303—15)

This invention relates to electro-pneumatic brake equipment, and more particularly to brake equipment for high speed trains and traction vehicles.

In the operation of railway trains and traction vehicles designed for high speed service, it is of prime importance that a braking equipment be provided which is capable of producing high retarding forces in a minimum length of time, so that the train or vehicle may be brought to a stop quickly. Such a braking equipment must of necessity be thoroughly reliable and preferably easily controlled. It is therefore a prime object of this invention to provide a thoroughly reliable and easily controlled brake equipment for operation in connection with high speed railway trains and vehicles.

Long experience has proven that the fluid pressure operated brake is highly dependable and well adapted to the braking of modern trains and vehicles. The application of fluid pressure brakes may be controlled either electro-pneumatically, or by the well known principle of reducing the pressure in a brake pipe, which is commonly referred to as automatic operation. It is therefore another object of this invention to provide a brake system which is controllable either electro-pneumatically or automatically.

It sometimes becomes necessary to control a train from either end, as when a train reaches the end of its run and facilities are not provided for turning the train around. It is another object of this invention to provide a braking system of the character above referred to which can be controlled from either end of the train.

When trains or vehicles employing fluid pressure brakes are brought to a stop quickly from relatively high speeds, high braking forces must be employed. When such high braking forces are employed, there is considerable danger of wheel sliding. It is therefore desirable to employ some means for limiting the braking force which may be applied, so as to minimize the danger of wheel sliding. A further object of this invention is to provide means for controlling the rate of retardation of a train or vehicle, so as to limit the rate to a value which will not produce wheel sliding.

Since, in the operation of trains and vehicles in high speed service, reliability is of prime importance, it is very desirable to have means for indicating to the operator whether or not certain automatically operating parts of the brake system are in condition for operation. It is therefore a still further object of this invention to provide means in connection with the electro-pneumatic control of the brake equipment for indicating to an operator the integrity of certain principal control circuits involved, and also when certain automatic control apparatus has functioned.

Yet another object of the invention is to provide a brake system in which brake applications may be effected electro-pneumatically or automatically, and in which failure of one of these to operate automatically effects operation of the other.

It is also highly desirable to provide a braking equipment which may be operated from without the train by some device purposely set, as when the train or vehicle is approaching a danger known only to persons outside the train. It is therefore a still further object of the invention to provide a braking system which is operable by engagement of an element on the train with an element outside of the train.

A still further object of the invention is to provide a novel arrangement of and special apparatus for accomplishing the above set forth objects.

Other objects and advantages of the invention will be apparent from the description of one embodiment of it, which is taken in connection with the attached drawings, wherein, Figures 1A, 1B and 1C, taken together show an embodiment as adapted to a three car train.

Figure 2 is a diagrammatic view of one of the control valve devices shown in the foregoing figures, with connections to associated apparatus.

While the embodiment about to be described has been shown in connection with a three car train, it will be appreciated that the invention is not limited to any specific number of cars. It will be noted from Figures 1A and 1C that duplicate equipment is provided on the head end and rear end cars, so as to provide for control of the brakes from either end of the train, according to the direction of travel. Intermediate cars, such as that indicated in Figure 1B, need only be provided with a relatively small portion of the brake equipment.

Considering now the invention briefly, there is provided on the head end and rear end cars a brake valve device, which is shown diagrammatically at 10, and which is adapted to control both electro-pneumatic and automatic operation of the brakes. On each car in the train there is provided a control valve device 12, which is operable to control the supply of fluid under pressure from a supply reservoir 14 to a connected brake cylinder 16 (see Figure 2), each control valve device being controllable from either brake valve device 10.

In order to provide for fast application of the brakes during automatic operation, there is provided on one or more of the intermediate cars, as shown in Figure 1B, a brake pipe vent valve device 18. If there is more than one intermediate car, brake pipe vent valve devices may be provided on each of these cars, although one or more of these devices located on one or more cars throughout the train may be sufficient.

For controlling the rate of retardation produced by application of the brakes, there is provided on both head end and rear end cars a retardation controller device, which is diagrammatically indicated at 20, and which is adapted to control certain operations of each control valve device 12.

In order to indicate to the operator the integrity of the principal control circuits between the retardation controller devices and the control valve devices, there are provided circuit checking devices comprising indicating means, such for example as lamps 22, 24 and 26, relays 28 and 30, and resistance devices 32 and 33. A checking device is provided on the rear car as well as on the front car.

For effecting an automatic operation of the brakes upon failure of the equipment to respond to movement of the brake valve device to effect electro-pneumatic operation, there is provided on each of the head end and rear end cars a timing relay 34, a brake cylinder interlock relay device 36, an emergency interlock magnet valve device 38, and an application valve device 40.

In order to provide for an electro-pneumatic operation of the brakes in case of accidental loss of brake pipe pressure, there has been included on both the head end and rear cars a brake pipe interlock relay device 42.

In order that the brakes may be applied from without the train, as by engagement of an element with a track trip, there has been provided a track trip operated switch device 44, an emergency trip magnet valve device 46, and an application valve device 48.

On each car in the train there is provided a conductor's valve device 50, which may be operated to effect an emergency application of the brakes in emergency cases.

Considering now more in detail the embodiment shown, the brake valve device 10 may be of any one of a large number of types, and for that reason we have shown this device diagrammatically in developed form as comprising a drum controller portion 52 and a rotary valve portion 54. The drum controller portion preferably comprises a drum upon which is mounted and insulated therefrom, and from each other, contact segments 56, 58, and 60. These segments are adapted to engage at certain times, as will hereinafter more fully appear, one or more stationary contact fingers diagrammatically indicated at 61 to 74 inclusive.

The drum controller portion 52 is provided for controlling electro-pneumatic operation of the brakes, while the rotary valve portion 54 is provided for controlling automatic operation of the brakes. These two portions are preferably coupled so that when the handle of the brake valve device 10 is moved, both the drum controller portion 52 and the rotary valve portion 54 are moved to a like degree.

The brake valve device 10 is preferably provided with a plurality of braking positions, such as are indicated in either Figure 1A or Figure 1B. In "Release" position of the brake valve device a portion of the segment 56 is in contact with contact fingers 69, 70, and 71. Contact finger 70 is connected to a positive supply conductor 76, which extends throughout the train, and which connects to the positive terminal of a battery 78, or other source of current supply, on each car in the train.

The contact finger 69 of each brake valve device connects with a transfer relay 79, for a purpose which will appear presently, and to a contact of the retardation controller device 20 on that car, of which more will be said later. The contact finger 71 is connected to the aforementioned timing relay 34 to maintain that relay energized, for a purpose which will also appear presently.

In "Release" position of each brake valve device, the rotary valve portion 54 connects a branch pipe 80, which is in turn connected to a brake pipe 82, with a supply pipe 84, by way of another branch pipe 86 and a feed valve device 88. The supply pipe 84 is connected to a main reservoir 90 on both the head end and rear cars, so that in release position of the brake valve device a substantially constant pressure is maintained in the brake pipe 82 by operation of the feed valve device 88, which may be of any of the types commonly employed for this purpose, the functioning of which is well known to those skilled in the art.

When the brake valve device 10 is moved from "Release" position toward the position indicated as "Full electric service" position, the brake pipe 82 is maintained connected to the supply pipe 84 by the rotary valve portion 54, as indicated, while the segment 56 sequentially engages contact fingers 61 to 67 inclusive, to increasingly cut out portion of a resistance device 92, to effect different degrees of brake application by electro-pneumatic operation, as will hereinafter more fully appear.

After the brake valve device has moved through a certain portion of the electric service zone, contact finger 71 disengages from the contact segment 56, to deenergize the aforementioned timing relay 34, the purpose of which will be more fully understood later.

When the brake valve device is moved to the position indicated as "Pneumatic service", the brake pipe 82 is disconnected from the supply pipe 84 and reconnected by a port 94, having a restriction therein, with a pipe 96 leading to the atmosphere. The brake pipe pressure is thus reduced at a service rate to effect a service application of the brakes by automatic operation, as will more fully hereinafter appear.

When the brake valve device is moved to the position indicated as "Emergency", the brake pipe 82 is connected to the atmosphere through an unrestricted port 98, so that the brake pipe pressure is reduced at an emergency rate, to effect an emergency application of the brakes.

When the brake valve device is in the position indicated as "Handle off" position, the control of the brakes is transferred to the brake valve device at the other end of the train.

Each brake valve device 10 is adapted to control all of the control valve devices 12. Each of the control valve devices comprises a self-lapping magnet valve portion 100, a relay valve portion 102, a triple valve portion 104, an inshot valve portion 106, a cut-off and release magnet valve 108, and a pipe bracket portion 109.

The relay valve portion 102 controls the supply of fluid under pressure from the connected supply reservoir 14 to the connected brake cylinder 16. Flow of fluid from the supply reservoir 14 to the brake cylinder 16 is controlled by a supply valve 110, which is disposed in a valve chamber 112. The valve 110 is urged toward a seat 114 by a spring 116. The valve 110 is urged away from seat 114 following unseating of a pilot valve 118, which is urged toward a seat 120, within the valve 110, by a spring 122.

When the pilot valve 118 is seated, the pressure acting upon valve 110 from valve chamber 112, plus the pressure of spring 116, will hold the valve upon its seat 114. When the pilot valve 118 is actuated to unseated position, fluid pressure in the valve chamber 112 is released past the unseated pilot valve to a slide valve chamber 124 at a rate faster than it can be supplied to the valve chamber 112 from supply chamber 126, which is in communication with the supply reservoir 14 by passage 128 and pipe 130. As a consequence, the pressure acting upon the upper side of valve 110 is reduced and the valve can then be unseated by a relatively small pressure from below. When the valve 110 is unseated, fluid under pressure may then flow from chamber 126 and supply reservoir 14 to the slide valve chamber 124.

Disposed in the slide valve chamber 124 is a slide valve 132, and for operating the slide valve 132 and for unseating the pilot valve 118 and the main supply valve 110 there is provided a piston 134 disposed in a piston chamber 136 and having a stem 138 for actuating said slide valve. The piston stem 138 is provided with an enlarged flanged portion 140 interfitting with a bore 142, for the purpose of providing a seal between the piston chamber 136 and the slide valve chamber 124. Also, the stem 138 is provided with a guiding element 144 for guiding movement of the stem when the piston 134 is moved upwardly and downwardly.

The slide valve chamber 124 is in constant communication with the brake cylinder 16 by way of pipe and passage 146, and is also in restricted communication with the piston chamber 136 by way of passage 148, in which is disposed a choke 150.

The slide valve 132 controls communication between the slide valve chamber 124 and the atmosphere, by way of passages 152 and pipe and passage 154.

In release position of the relay valve portion 102, which is that shown in Fig. 2, the piston 134 is in its lowermost position, where an annular flange thereon contacts and seals with a corresponding annular portion of a gasket 156. In this position, the slide valve 132 uncovers one passage 152 and a port 151 therein registers with the other passage 152, so that fluid pressure may be released from the connected brake cylinder to the atmosphere, by way of pipe and passage 146, slide valve chamber 124, passages 152, and pipe and passage 154.

When the relay piston 134 is actuated upwardly to application position, slide valve 132 blanks both of passages 152, to cut off venting of the brake cylinder 16, and to thereafter cause the upper end of valve stem 138 to first engage stem 155 of pilot valve 118, to partially unload the main valve 110, and then to engage and unseat the main supply valve 110. Unseating of the supply valve 110 permits fluid under pressure to flow from the supply reservoir 14 to the connected brake cylinder, by way of the passages heretofore described.

Relay piston 134 is actuated to application position by the supply of fluid under pressure below the piston. When fluid under pressure is thus supplied below the piston it acts initially upon the piston area within the annular flange in engagement with the gasket 156. As soon as the piston is lifted from the gasket 156, fluid pressure acts upon the total piston area and thus causes the piston to move quickly upwardly to application position.

When the supply of fluid to the space below the piston has been cut off, the pressure of fluid flowing to the space above the piston, through choke 150, equalizes with that below, whereupon the piston moves downwardly until the supply valve 110 is seated. The supply of fluid under pressure to the brake cylinder is then lapped.

The supply of fluid under pressure beneath relay piston 134 is primarily controlled by the self-lapping magnet valve portion 100 during electro-pneumatic operation or by the triple valve portion 104 during automatic operation, and secondarily by the inshot valve portion 106 and cut-off and release magnet valve portion 108 during either operation.

The self-lapping magnet valve portion 100 is provided with a supply valve 160, which controls the flow of fluid under pressure from the supply reservoir 14 to the under side of relay piston 134, by way of pipe 130, passage 162, past supply valve 160 when unseated, passage 164, and from thence through the inshot valve portion, and the cut-off and release magnet valve portion, as will hereinafter be more fully described.

The supply valve 160 is urged toward seated position by a spring 166, and to unseated position by action of an electromagnet having a winding 168, which when energized actuates members to be described to unseat the valve. When the winding 168 is energized the magnetic effect produced thereby actuates a movable core member 170 downwardly. Secured to the core member 170 is a stem 172 which engages a pin 174 when moved downwardly, the pin in turn actuating a sliding member 176 to cause unseating of the supply valve 160. The sliding member 176 is provided with a valve seat 178 which engages and interfits with the end of the stem of the supply valve 160, which end forms a release valve 180, controlling the release of fluid pressure from the under side of relay piston 134.

The sliding member 176 is normally held in an upper or release position by a resilient diaphragm 182, which is secured thereto and to the casing embodying the self-lapping valve device 100 in a manner to form a chamber 184 therebelow and a chamber 186 thereabove. When the sliding member 176 is in its upper position, the release valve 180 is unseated, so that fluid pressure is released from the under side of relay piston 134 to the atmosphere, past the unseated release valve, through orifice 187, passage 188, and port 190.

The downward movement of the movable core 170 and the stem 172 is opposed by a spring 192 reacting against a spring cup 194 secured to the upper end of the stem 172. The downward movement of the movable core 170 and stem 172 is governed or limited by a flanged collar 196, which is adapted to engage a stop washer 198 upon a predetermined downward movement of the core and stem.

As may be seen from the construction shown in Figure 2, the spring cup 194 is adjustable with respect to the stem 172, and in a similar manner the flanged collar 196 may be adjusted to different positions along the stem 172. Further adjustment is provided in that the stem 172 has a screw-thread connection with the movable core 170.

The lower end of the movable core member 170 is preferably of a beveled configuration, as shown in Figure 2, and interfits with a corresponding recessed portion in a lower stationary core 200, so as to provide an air gap therebetween of somewhat decreased reluctance. The casing embodying the valve device provides the return path for the magnetic flux established by the energized winding 168.

When winding 168 is energized, supply valve 160 is unseated an amount in accordance with the downward movement of stem 172 and core 170. This movement is opposed by spring 192 and is thus determined by the degree of energization of the winding 168.

When supply valve 160 is unseated fluid under pressure flows to chamber 184 below diaphragm 182, via passage 185, as well as to the under side of relay piston 134. When the fluid pressure acting below diaphragm 182 overbalances that acting downwardly on the diaphragm, it moves the member 176 secured thereto upwardly to permit supply valve 160 to be seated by its spring 166. The supply of fluid under pressure to relay piston 134 will then be lapped.

If the pressure below diaphragm 182 is great enough, release valve 180 may be unseated to release pressure from the supply valve portion. If, on the other hand, after valve 160 is seated the pressure below the diaphragm diminishes, due to leakage or for other reasons, the diaphragm is actuated downwardly by the force of the electromagnet above, to unseat valve 160 and thus readmit fluid under pressure. The self-lapping magnet valve portion thus operates to supply and maintain a pressure to the relay valve portion in accordance with the current supplied to the winding 168.

As before indicated, fluid under pressure flowing to the under side of relay piston 134, flows through the inshot valve portion 106. The inshot valve portion is provided with a ball valve 202 disposed in a valve chamber 204. The ball valve 202 is engaged by a stem 203 to which is secured a piston 206. The piston 206 is disposed in a piston chamber 208 and is urged upwardly to unseat the ball valve 202 by a spring 210. An adjusting member 212 is provided for adjusting the tension on the spring 210, and the piston 206 is provided with an additional stem 214 passing through this adjusting member 212, and having adjusting nuts 216 threadably disposed thereon for adjusting the unseating movement of the ball valve 202.

The ball valve chamber 204 is in communication with a double check valve chamber 218 which has disposed therein a double check valve 220. The double check valve chamber 218 connects with the aforementioned passage 164 from the self-lapping valve portion 100, so that when fluid under pressure is supplied to this passage the double check valve 220 is forced to an upper position where it seals against a gasket 222 and thereby permits flow from the passage 164 to the passage 219 leading to the ball valve chamber 204.

From the ball valve chamber 204 fluid may flow past the unseated ball valve 202 to a passage 224 leading to the under side of the relay piston 134. When the pressure of the fluid supplied to the under side of the relay piston 134 reaches a predetermined value, it acts upon the upper side of the inshot piston 206 and actuates the piston downwardly against resistance of spring 210, to seat the ball valve 202. After the ball valve 202 is seated, the flow of fluid from the ball valve chamber 204 is by way of passages through the cut-off and release magnet valve portion 108, as will now be described.

Connecting the ball valve chamber 204 with a lower cut-off valve chamber 226 is a passage 228. A cut-off valve 230 controls the flow of fluid under pressure from this lower chamber 226 to an upper valve chamber 232, which upper chamber connects with the passage 224 leading to the under face of the relay piston 134 by way of passages 234 and 236.

The cut-off valve 230 is urged toward unseated position by a spring 238, and toward seated position by action of an electromagnet (not shown) in the upper part of the casing above the valve, which when energized actuates a stem 240 downwardly to seat the valve.

The magnet valve section 108 is also provided with a release valve chamber 242 which is in communication with the aforementioned passage 234, leading to the under side of the relay piston 134, by way of a choke 244. Disposed in the release valve chamber 242 is a release valve 246. The release valve 246 controls the flow of fluid from the release valve chamber 242, and hence from the under side of relay piston 134, to an upper chamber 248, which is in communication with the atmosphere by way of passage 250 and a safety valve device 252.

The release valve 246 is urged toward seated position by a spring 254, and to unseated position by action of an electromagnet (not shown) in the upper part of the casing above the valve, which when energized actuates a stem 256 downwardly to unseat the valve.

The safety valve device 252 may be of any of the types commonly employed, the function of which, as is well known, is to retain a predetermined pressure in the volume to which it is connected.

The flow of fluid under pressure to the under side of relay piston 134 may be also controlled by the triple valve portion 104, as heretofore indicated. This portion is provided with a slide valve chamber 258 in which is disposed a main slide valve 260 and a graduating valve 262. For operating the main and graduating valves there is provided a piston 264 disposed in a piston chamber 266. The piston 264 is provided with a stem 268 which is adapted to move the graduating valve 262 simultaneously therewith, and to move the main slide valve 260 with a delayed or lost motion.

The piston chamber 266 is in communication with the brake pipe 82 by way of pipe and passage 270. When the pressure in the brake pipe is normal, that is, maintained at a predetermined value, the piston 264 is in its lowermost position, as shown in Figure 2, which is also the release position. In this release position a cavity 272 in the main slide valve 260 connects a passage 274, which leads to the atmosphere by way of pipe 275, with a passage 276 which has two branches, one branch leading by way of pipe 278 to a volume reservoir 280, and the other branch leading through passage 282 to the double check valve chamber 218.

In release position, the main slide valve 260 also has a port 284 in registration with a passage 286 leading to a valve chamber 288 in which is disposed a fast recharge valve 290, which is urged toward a seated position by a spring 292.

When the pressure in the piston chamber 266 is reduced at a service rate, the piston 264 moves upwardly to service position due to the overbalancing pressure beneath the piston in the slide valve chamber 258, this pressure being supplied from an auxiliary reservoir 294, which is in communication with the slide valve chamber 258 via pipe and passage 295.

In service position, the main slide valve 260 blanks the passages 274 and 286 and brings port 296 in registration with passage 276, the graduating valve 262 having uncovered the port 296 at this time. Fluid under pressure may then flow from the main slide valve chamber 258, and the auxiliary reservoir 294, to both the volume reservoir 280 and the under face of relay piston 134, the double check valve 220 being actuated to a lower position against gasket 298. When the pressures on either side of piston 264 equalize, it will move to lap position, where graduating valve 262 blanks port 296.

When the pressure in piston chamber 266 is reduced at an emergency rate, the piston 264 moves upwardly and seals against gasket 300, and the main slide valve 260 uncovers the passage 276, while blanking passages 274 and 286. Fluid may then flow from the slide valve chamber 258 and auxiliary reservoir 294 at an unrestricted rate to both the volume reservoir 280 and the under side of the relay piston 134.

Energization of the electromagnets controlling operation of the cut-off valve 230 and the release valve 246 is controlled by one of the retardation controller devices 20. These devices may be of one of a large number of types and for that reason we have shown only one type in diagrammatic form. This type comprises a pendulum 302 which is suspended from a pivoting member 304, preferably having frictionless bearings, and carries contacts 306 and 307 insulated therefrom and from each other.

Each retardation controller is positioned on a vehicle so that during changes in the rate of speed of the train, the pendulum 302 swings to the right or left, depending upon whether the train is accelerating or decelerating. When the train is decelerating from motion to the left, as viewed in the several figures, the pendulum swings to the left to cause contact 306 to successively engage resilient and yielding contacts 308 and 310. When the train is accelerating, during motion to the left, the pendulum 302 swings to the right to cause contact 307 to engage similar resilient and yielding contacts 309 and 311.

The contacts 309 and 311 may be connected to apparatus for controlling the acceleration of the train, such for example as is described and claimed in a copending application of Clyde C. Farmer, Serial No. 707,918, filed January 23, 1934.

The contact 308 of each device is connected to the electromagnet of each control valve device controlling operation of the cut-off valve 230, through conductor 312, contacts 314 of a transfer relay 79, conductor 316 and train conductor 318, the latter of which extends throughout the train.

The contact 310 of each device is similarly connected to the electromagnet of each control valve device controlling operation of the release valve 246, by way of conductor 320, contact 322 of a transfer relay 79, and conductor 324 and train conductor 325, the latter of which extends throughout the train. Thus when contact 306 of the retardation controller device engages contact 308 all of the cut-off valves 230 are actuated to seated position, and when the contact 306 engages contact 310, all of the release valves 246 are actuated to unseated position.

The brake pipe vent valve device 18 is provided with a quick action valve 326, which is adapted to control local release of fluid under pressure from the brake pipe, by way of pipe 328, passage 329, valve chamber 330, and passage 332.

The quick action valve 326 is urged toward seated position by a spring 334, and to unseated position by action of a quick action piston 335, which moves to the left to unseat the quick action valve when fluid under pressure is supplied to piston chamber 336 in which the piston is disposed.

A light spring 338 acts constantly upon the piston 335 to urge it to unseat the quick action valve 326, but the quick action valve is normally held seated by the overbalancing pressure of its spring 334.

The brake pipe vent valve device is also provided with a slide valve 340, for controlling the supply of fluid under pressure to the piston chamber 336, through passage 355, to actuate the piston 335. For actuating the slide valve 340, there is provided an emergency piston 342, operatively mounted in a piston chamber 343.

When the pressure in the brake pipe is maintained at a normal value, fluid under pressure will be supplied to the emergency piston chamber 34, by way of pipe 328, and passage 329. Fluid pressure in this chamber actuates the emergency piston 342 to its lowermost position, whereupon slide valve 340 is positioned upon its seat to cut off the flow of any fluid to the quick action piston chamber 336.

Fluid under pressure in the emergency piston chamber 343 also flows to a quick action chamber 344 in the brake pipe vent valve device casing, by way of passage 345, past a restriction 346 and a ball check valve 347, chamber 348 containing the slide valve 340, and passage 350.

When a service rate of reduction is effected in brake pipe pressure, the pressure above the emergency piston 342 is accordingly reduced and the overbalancing pressure below the piston actuates it upwardly until a graduating stem 352 engages a stop 353. When this takes place slide valve 340 will be position to connect slide valve chamber 348 and quick action chamber 344 with passage 332 leading to the atmosphere, through a restricted port 354 in the slide valve. At the same time, the slide valve will continue to blank passage 355 leading to the quick action piston chamber 336. Quick action chamber pressure will therefore be released to the atmosphere and quick action valve 326 will remain seated.

When an emergency rate of reduction in brake pipe pressure is effected, emergency piston 342 moves upwardly to compress graduating spring 358, whereupon the slide valve 340 is positioned to connect quick action chamber 344 to quick action piston chamber 336, by way of passage 355. Quick action chamber 344, therefore, equalizes to quick action piston chamber 336, to cause quick action valve 326 to be opened wide to locally vent brake pipe pressure to the atmosphere at an emergency rate.

The pressure in both the quick action chamber 344 and the emergency piston chamber 336 will eventually be released to the atmosphere through a restricted port 360 in the quick action piston 335, and when this pressure has dropped to a sufficiently low value spring 334 will seat the quick action valve 326, as before described.

When the pressure in the brake pipe has been restored to normal value, piston 342 returns to its lowermost position and the quick action chamber 344 is recharged through the passage 345, past the ball check valve 347, which prevents back flow to the brake pipe from the quick action chamber during an automatic application of the brakes. The restriction 346 is provided in the passage 345 to limit the rate of build-up of quick action chamber pressure.

The brake cylinder interlock relay device 36 and the brake pipe interlock relay device 42 have similar actuating parts, each having a casing defining a piston chamber 362 in which is disposed a piston 363 urged downwardly by a spring 364. The piston 363 is urged upwardly by fluid under pressure supplied therebelow.

The brake cylinder interlock relay device 36 has its piston chamber 362 connected by a pipe 365 to the pipe 146 leading from each control valve device to the connected brake cylinder 16. This relay device is also provided with contacts 366, which are closed, and contacts 367, which are open, when the piston is in its lowermost position.

When fluid under pressure is supplied to the under side of the piston 363 in the brake cylinder interlock relay device 36, the piston is actuated upwardly to open contacts 366 and close contacts 367, the purpose of which will appear presently.

The brake pipe interlock relay device 42 is provided with contacts 370, which are closed when the piston 363 of this device is in lowermost position, and are open when the piston is actuated to its upper position. The piston chamber 362 of this relay device is connected to the brake pipe 82, by way of pipe 371, so that when the pressure in the brake pipe is normal the piston 363 therein will be held in its uppermost position, and contacts 370 will therefore be open.

The emergency interlock magnet valve device 38 is embodied in a casing defining a valve chamber 372 in which is disposed a valve 373. The valve 373 is actuated to seated position by a spring 374, and to unseated position by an electromagnet in the upper part of the casing which when energized actuates a stem 375 downwardly to unseat the valve. The valve 373 controls the release of fluid under pressure from the valve chamber 372 to the atmosphere, by way of a port 376 in the casing.

The valve chamber 372 is connected to a valve chamber 378 in the application valve device 40, by way of pipe 379. The application valve device 40 and the application valve device 48 may be of the same design, and the description of one therefore suffices for the description of the other.

Disposed in the valve chamber 378 of each of these devices is a valve 380, which controls the flow of fluid under pressure from a chamber 382, connected to the brake pipe 82 by way of pipe 383, and a chamber 384 connected to the atmosphere by a pipe 385.

The valve 380 is urged toward seated position by a spring 386, and to unseated position by overbalancing pressure of fluid in chamber 382 acting upon the under area of the valve outside of the valve seat. The chamber 382 is connected to the chamber 378 by way of a restricted passage 388, so that when the pressure in the valve chamber 378 is suddenly released to the atmosphere, the pressure acting on the under side of the valve is effective in overcoming the resistance of spring 386 to unseat the valve, before the pressure in chamber 378 can build up.

The emergency trip magnet valve device 46 is embodied in a casing having a chamber 390, which is connected to the valve chamber 378 of the application valve device 48, by pipe 391. The magnet valve device 46 is also provided with a valve 392, which is adapted to control the flow of fluid from the aforementioned chamber 390 to the atmosphere, by way of port 393. The valve 392 is urged toward unseated position by a spring 394, and to seated position by action of an electromagnet in the upper part of the casing having a winding 395, which when energized actuates a stem 396 downwardly to seat the valve.

The upper end of the stem 396 has secured thereto and insulated therefrom a contact element 397, which is adapted to engage stationary contacts 398 when the winding 395 is energized, and to be disengaged therefrom when the winding 395 is deenergized.

The track trip switch device 44 is provided with stationary contacts 400, which are normally connected together by a bridging contact 401 held in contact therewith by a spring 402. The spring 402 acts downwardly upon a plunger 403, which is secured to and insulated from the bridging contact 401.

For disengaging the bridging contact 401 from the stationary contacts 400, there is provided a lever 404 which is pivotally mounted to some portion of the vehicle at 405, and which is provided with a T-shaped upper portion for engagement with, but insulated from, the bridging contact 401. The lever 404 is adapted to be actuated about the pivot 405 by engagement with some fixed element without the train, as for example with a track trip element 406, the use of such element being well known in railroad practice.

Each of the conductor's valve devices 50 is provided with a valve 408, which controls the release of fluid under pressure from the brake pipe 82 to the atmosphere when a lever 409 is operated. The valve 408 is urged toward a seat 410 by a spring 411, and when the lever 409 is rotated in a counterclockwise direction an intermediate lever 412 is actuated to move valve stem 413 downwardly to unseat the valve 408. When the valve 408 is unseated, fluid under pressure in the brake pipe 82 may flow at an emergency rate to the atmosphere past the unseated valve and through port 414.

The operation of this embodiment of our invention is as follows:

*Running condition*

When the train is running, the brake valve device at the head end is maintained in "Release" position, while the brake valve device at the rear end is maintained in "Handle off" position. Contact segment 60 in the brake valve device at the rear end of the train connects fingers 68 and 72, the purpose of which will appear presently.

At the front end of the train the timing relay 34 and the transfer relay 79 are energized, while at the rear end of the train these two relays are deenergized.

The rotary valve portion 54 of the brake valve device at the head end of the train connects the supply pipe 84 with the brake pipe 82, so that a predetermined pressure is maintained in the brake pipe. The piston 363 of each brake pipe interlock relay device 42 is thus held in its uppermost position, whereupon contacts 370 are held open.

During running condition the emergency interlock magnet valve devices 38 are deenergized, while the emergency trip magnet valve devices 46 are energized, so that the valves 380 of the application valve devices 40 and 48 are held in seated position. Current to energize the emergency trip magnet valve devices 46 is supplied from the positive supply conductor 76, by way of conductors 415 and 416, contacts 397 and 398, conductor 417, contacts 400 and 401 of the track trip switch device 44, and conductor 418, the return connection to the other terminal of the batteries being through the ground connection shown.

In the control valve device 12 on each car in the train, the winding 168 of the self-lapping portion 100 is deenergized, and the fluid pressure in the piston chamber 266 of the triple valve portion 104 is maintained at brake pipe value, so that all parts of the control valve device are in release position. The brake cylinder 16 on each car is thus connected to the atmosphere and the brakes are held in release position.

With the brake cylinder connected to the atmosphere, the brake cylinder interlock relay devices 36 have their pistons 363 forced to lowermost position, so that contacts 366 are closed and contacts 367 held open.

While the train is running the supply reservoirs 14 are charged from the supply pipe 84, and the auxiliary reservoirs 294 are charged from the brake pipe 82 through a feed groove 420 around the piston 264 in the triple valve portion 104 of each control valve device.

The batteries 78 are charged during running condition by operation of charging apparatus diagrammatically indicated at 428. This apparatus is preferably connected to the batteries 78 by circuits (not shown) in a manner such that during running of the train the batteries are automatically charged whenever their voltage drops below a given value, and so that charging ceases upon an electro-pneumatic application of the brakes.

To provide for charging of the batteries during an electro-pneumatic application, the charging apparatus has a control element connected to a control wire 429, which extends throughout the train and which, through contacts 430 of one of the transfer relays 79, connects to the resistance unit 92 of the head end brake valve device, so that when the brake valve device is moved to electric service position the control element will be energized to effect charging of the batteries as during running condition.

*Operation of checking devices*

Through the indicating lamps 22, 24 and 26 on the head end car, the operator is informed whether or not faults exist in the control circuits extending throughout the train between the retardation controller device and the control valve devices.

At the head end of the train the checking relay 28 is connected to the aforementioned train conductor 325 adjacent the release electromagnet in the control device 12 on the head end car, by way of conductor 320, contacts 322 of the transfer relay 79 and conductor 324. The relay is also connected to a conductor 424, which also extends throughout the length of the train, by way of conductor 425, contacts 426 of transfer relay 79, and conductor 427.

The checking relay 30 is also connected to the conductor 424 through the same path as just described, and to train conductor 318, which extends throughout the train, by way of contacts 314 of the transfer relay 79, and conductor 316.

At the rear end of the train the train conductors 318 and 325 are connected to the ground or negative side of the batteries 78, by way of conductors 316 and 324, back contacts 432 and 433 of the transfer relay 79 on the rear car, resistance devices 32 on the rear car, and conductor 435.

Also, at the rear end of the train the conductor 424 is connected to the positive supply conductor 76, by way of conductor 427, back contact 437 of the transfer relay 79, resistance device 33 on the rear car, and conductor 415. The checking relays 28 and 30 on the head end car are therefore energized through the circuits just described, and each relay closes its contacts 440. Closing of the contacts 440 energizes the indicating lamp 22 from the positive supply conductor 76, by way of conductors 415 and 441. Lighting of the indicating lamp 22 informs the operator that no faults of a general nature exist in the circuits leading to the control valve devices from the retardation controller device.

Should the circuits between the retardation controller device and the electromagnets of the cut-off and release magnet valve portion of each control valve device contain faults, such as open circuits, cross wires, etc., it will be obvious that one or both of the checking relays 28 and 30 will be deenergized, and deenergization of either will open the circuit to the indicating lamp 22, thereby indicating the existence of a fault.

During running condition the indicating lamps 24 and 26 are not lighted because directional devices 442 are connected between these indicating lamps and the conductor 425, which is now connected to the positive terminal of the batteries at the rear end of the train, and these directional devices prevent the flow of current through the lamps. These directional devices are preferably of the type commonly referred to as copper oxide rectifier units, although they may be of any other suitable type.

Faulty energization of the cut-off and release electro-magnets in each control valve device 12, by supply of current through the circuits just described from the rear end of the train, is prevented by the connection of other directional devices 442 between the electromagnets and the conductor 424, as may be seen from Figures 1A, 1B and 1C.

*Service application*

When it is desired to effect a service application of the brakes, the brake valve device is moved from "Release" position toward "Full electric service" position a degree in accordance with the desired degree of braking. Assuming as an example that the brake valve device is moved to the position where finger 65 contacts with the segment 56, but before finger 66 has contacted with the segment, it will be apparent that each of the windings 168 in the self-lapping magnet valve portion 100, of each control valve device, will have current supplied thereto from the positive supply conductor 76, by way of finger 70 of the brake valve device, segment 56, finger 65, the portion of the resistance 92 between fingers 65 and 67, conductors 444 and 445, and branch conductors 443. The other terminal of each winding 168 connects by branch conductors 447 to a conductor 446, which also extends throughout the train, and which is connected to the ground or negative battery terminal at or about the middle of the train, through a conductor 448 and a switch 449, for the purpose of preventing voltage differences along the track, while current is supplied to the propelling motors, from undesirably energizing the windings 168, as well as to cause more nearly equal energization of these windings during a brake application.

Current thus flows from the batteries 78 to the windings 168 through that portion of the resistance 92 in series therewith. The magnetic flux produced by the energized windings 168 actuates the movable core member 170 downwardly to cause seating of the release valve 180 and unseating of the supply valve 160, in each control valve device, as before described. Fluid under pressure then flows from each supply reservoir 14 to the under side of each relay piston 134, through the passages heretofore described.

Fluid pressure beneath the relay piston 134 actuates the slide valve 132 to cut off venting of the connected brake cylinder 16, and to effect unseating of the supply valve 110, so that fluid under pressure may flow from each supply reservoir 14 to each connected brake cylinder 16.

As the pressure in the brake cylinder builds up, a value will be reached at which the inshot piston 206 will be forced downwardly to seat the ball valve 202. Thereafter the flow of fluid to the under side of the relay piston 134 will be by way of the path through the cut-off and release magnet valve portion 108, as described. The purpose of the inshot valve section is to insure a brake application sufficient to stop the train should the path through the magnet valve section be accidentally closed. The supply of fluid under pressure to the relay valve portion will be lapped by the self-lapping valve portion when the pressure reaches a value corresponding to the brake valve movement, as before described. When the supply of fluid thereto has been lapped, the piston 134 moves to lap position.

As each self-lapping portion 109, of each control valve device, operates independently of every other self-lapping portion, it is obvious that the brake cylinder pressures will be maintained substantially uniform throughout the train, according to the position of the brake valve device, and regardless of differences in piston travel, leakage, etc.

As pressure builds up in the brake cylinders 16, the train begins to decelerate. If the rate of retardation produced by application of the brakes is sufficient to cause the pendulum 302, of the retardation controller device 20, to swing far enough to the left to cause engagement of contact 306 with contact 308, then the cut-off electromagnet in each control valve device will be energized to cause seating of each cut-off valve 230. When this takes place the flow of fluid to the under side of each relay piston 134 will be cut off, unless already cut off by the self-lapping valve portion.

If the rate of retardation is great enough to cause engagement of contact 306 with contact 310, the release electromagnet in each control valve device will be energized to cause unseating of each release valve 246. Fluid pressure will then be released from the under face of each relay piston 134 to the atmosphere by way of the safety valve device 252, the safety valve device functioning to retain a predetermined pressure therebelow in accordance with its setting.

As fluid under pressure is released from the under side of each relay piston 134, the piston moves downwardly and connects the brake cylinder with the atmosphere by the passages already described. Release of fluid pressure from the brake cylinders will of course diminish the rate of retardation. As the rate of retardation diminishes, the pendulum 32 of the retardation controller device swings back to the right, causing disengagement of contact 306 from contact 310. Disengagement of these contacts deenergizes the release electromagnets, and the release valves 246 are then seated by their springs. The relay valve piston 134 will then move again to a lap position.

If the release of fluid pressure from the brake cylinders has been more than necessary to decrease the rate of retardation to the desired value, then contact 306 disengages from contact 308, and fluid is again supplied to the under face of relay piston 134, to again cause fluid to be supplied to the brake cylinders. It will be quite obvious then that the retardation controller device will function to cut off, release, and re-supply fluid to the brake cylinders to maintain a rate of retardation in accordance with the setting of the retardation controller device, provided of course that the brake valve device has been moved to a position corresponding to the necessary degree of braking.

Frequent operation of the retardation controller devices 20 may cause burning of the contacts therein. To minimize this wear, condenser devices 458 are connected across each electromagnet winding of each control valve device.

Now when the brake valve device was moved to the position assumed, finger 71 disengaged from the segment 56. This disengagement deenergizes the timing relay 34. The timing relay 34 is of the slow release type, so that a definite interval of time elapses before its contacts 450 close. When these contacts close, a circuit is established to the emergency interlock magnet valve device 38 from the positive supply conductor 76, by way of fingers 70 and 69, conductor 452, contacts 450, and conductor 451, the return circuit to the negative battery terminal being by way of conductor 453, and contacts 366 of the brake cylinder interlock relay device 36.

However, if the pressure in the brake cylinder on the head end car has reached a predetermined value, great enough to urge the piston 363 in the brake cylinder interlock relay device upwardly to open contacts 366, then the emergency interlock valve device 38 will not be energized. The timing relay therefore functions to effect an emergency application of the brakes, as will hereinafter be more fully explained, upon failure of the self-lapping portion of the control valve device to effect a predetermined brake cylinder pressure great enough to operate the brake cylinder interlock relay device 36.

When the brake valve device 10 is moved to "Full electric service" position, all of the resistance 92 is cut out of circuit, so that the winding 168, of the self-lapping portion 109 in each control valve device 12, is energized to its maximum degree. As will be obvious from the foregoing, the fluid pressure effected in the brake cylinders will then be a maximum.

When the brake valve device is moved to the "First electric service" position, fingers 73 and 74 are connected by the segment 58. Finger 73 is connected to the conductor 424, which as before described, is the common return conductor for the relays 28 and 30, for indicating lamps 24 and 26, and for the cut-off and release electromagnets of the control valve devices. Finger 74 is grounded and is therefore connected to the negative battery terminals.

Before fingers 73 and 74 were connected together, the polarity of conductor 424 was positive, due to the connection to the positive supply conductor 76 at the rear end of the train. After finger 73 has been connected to finger 74, the polarity of the conductor 424, to the left of the resistance device 33 at the rear end of the train, is of a negative polarity, so that as soon as contact 306 of the retardation controller device has engaged contact 308, indicating lamp 26 will be lighted, and when contact 306 engages contact 310, indicating lamp 24 will be lighted. It will thus be seen that the indicating lamp 26 will be lighted when the retardation controller device has supplied current to the circuit leading to the cut-off electromagnet in each control valve device, while the indicating lamp 24 will be lighted when current has been supplied to the circuit leading to each release electromagnet.

From the manner in which the circuits have been arranged, as shown in the drawing, it will be obvious that the checking devices check the integrity of the circuits for the full distance throughout the train, as the conductors leading to each electromagnet loop rather than connect thereto by branch conductors.

*Auxiliary service application*

In case of failure of the electro-pneumatic control apparatus, a pneumatic service application may be made by movement of the brake valve to "Pneumatic service" position. In this position the rotary valve portion 54 disconnects the brake pipe 82 from the supply pipe 84, and reconnects the brake pipe to the atmosphere, through the port 94 having the restriction therein. Brake pipe pressure is thus released to the atmosphere at a service rate.

As before explained, a service rate of reduction in brake pipe pressure at the brake valve does not effect operation of the brake pipe vent valve device 18 to cause a further reduction in brake pipe pressure.

Upon a service reduction in brake pipe pressure, piston 264 of the triple valve portion of each control valve device moves to service position, whereupon fluid under pressure is supplied from the auxiliary reservoir 294 to the under side of each relay piston 134 and to the volume reservoir 280, as before explained. Fluid under pressure supplied to the under side of each relay piston 134 effects a service application of the brakes, in the same manner as heretofore described.

The pressure which may be supplied to the under side of the relay piston 134 from the auxiliary reservoir 294 should preferably be limited to a lower value than when supplied from each supply reservoir through the self-lapping magnet valve portion of each control valve device, and hence the auxiliary reservoir is arranged to equalize to the volume of itself and the volume reservoir 280. This arrangement is provided because if the failure of the electro-pneumatic portion of the equipment has been due to failure of the current supply, then the retardation controller device is rendered inoperative, and there will be no automatic control of the rate of retardation so as to prevent wheel sliding. By limiting the pressure supplied to the relay valve portion to a lower value, adequate braking can be secured with the danger of wheel sliding greatly minimized.

Since fluid supplied to the under side of each relay piston flows through substantially the same path as during an electric service application, the inshot valve portion will operate as before described. Also, if the pressure effected in the brake cylinders should rise to a value high enough to produce rates of retardation which will cause operation of the retardation controller device, and a current supply is available, the cut-off and release electromagnets may be energized as before.

During a service reduction in brake pipe pressure the brake pipe interlock relay devices 42 continue to hold their contacts 370 open.

*Emergency application*

When it is desired to effect an emergency application of the brakes, the brake valve device is moved to the position indicated as "Emergency" position. In this position, full strength current will be supplied to each self-lapping magnet valve winding 168, while the port 98 in the rotary valve portion 54 will vent the brake pipe 82 to the atmosphere to release fluid under pressure therefrom at an emergency rate.

The self-lapping magnet valve device of each control valve device will operate to supply a maximum degree of fluid under pressure to the under side of each relay piston 134. At the same time, the emergency reduction in brake pipe pressure causes the brake pipe vent valve device 18 to operate to effect a quickened emergency reduction in brake pipe pressure, so that each triple piston 264 moves quickly to emergency position, to also supply a maximum degree of fluid under pressure to the under side of each relay piston 134. Since the flow of fluid from the self-lapping valve portion and the triple valve portion must flow past the double check valve 228, it will be obvious that only the supply which dominates in pressure will reach the relay valve portion.

Thus during an emergency application, a double supply of fluid to operate the relay valve portion of each control valve device is available, thereby insuring operation of the control valve devices to supply a maximum degree of fluid under pressure to the brake cylinders. It will be noted, however, that in both electric service and emergency applications fluid to the brake cylinders is supplied from the supply reservoirs.

During an emergency application of the brakes, the inshot valve portion of each control valve device will function in the same manner as heretofore described. Likewise, the retardation controller device 20 will also function in accordance with the rate of retardation produced, to control operation of the cut-off and release valves of each control valve device.

If while the brake valve device is in "Release" position, there should be an accidental loss of brake pipe pressure, the brake pipe interlock relay devices 42 will close their contacts 370. Closing of these contacts effects a circuit direct from the batteries 78 to each of the self-lapping magnet valve windings 168, so that a full service application of the brakes results.

As before described, if after the brake valve device has been moved past a given electric service position, a definite pressure should not be built up in the brake cylinders within a predetermined time, the timing relay 34 will close its contacts 450, to energize emergency interlock magnet valve device 38. Energization of the emergency interlock magnet valve device 38, causes fluid pressure to be released from the application valve chamber 378, in the application valve device 40, so that the valve 380 therein is unseated. Fluid under pressure is then released from the brake pipe 82 to the atmosphere at an emergency rate, to effect an emergency application of the brakes, as heretofore described.

In a similar manner, if the lever 404 of the track trip switch device 44, should engage a track trip 406, or some similar trip element, bridging contact 401 would be disengaged from one or both of stationary contacts 400. This would interrupt the circuit to the emergency trip magnet valve device 46, so that its valve 392 would be unseated, to release fluid pressure from the valve chamber 378 of the application valve device 48. The valve 380 therein would be unseated to release fluid under pressure from the brake pipe 82 to the atmosphere at an emergency rate.

It will be noted that when the winding 395 of the emergency trip magnet valve device 46 is de-energized, contact 397 will be disengaged from contact 398, so that the winding 395 cannot be reenergized through the circuit including these contacts. The winding may however be reenergized by movement of the brake valve device to "Emergency" position.

This movement connects fingers 68 and 72 on the brake valve device at the head end of the train to the positive supply conductor 76, so that the emergency trip magnet valve device 46 at the rear end of the train is energized through conductor 454 connected to finger 72, fingers 68 and 72 and segment 60 of the brake valve device at the rear end of the train, conductor 417, and contacts 400 and 401 of switch device 44, while the magnet valve device at the head end of the train is energized through conductor 417 connected to the finger 68, and a similar path to that described at the rear of the train. After these valve devices have been energized the brake valve device may be moved to release position, because the engagement of contact 397 with contacts 398 will provide a holding circuit therefor.

When in emergency cases it is desired to effect an application of the brakes from some point throughout the train other than in the operator's cab, the lever 409 of one of the conductor's valve devices 50 may be operated in a counterclockwise direction, to unseat the valve 408 therein. This will release fluid under pressure from the brake pipe to the atmosphere at an emergency rate, and thereby cause an emergency application of the brakes.

Release of brakes

When it is desired to effect a release of the brakes following a service application, the brake valve may be moved to "Release" position.

In this position the windings 168, of the control valve devices, will be deenergized, permitting the supply valves 160 to be seated and the release valves 180 to be unseated. As will be obvious, this will release fluid pressure from below each relay piston 134 to the atmosphere, to effect a release of fluid pressure in each brake cylinder to the atmosphere.

The same movement of the brake valve device will produce the same result following either a "Pneumatic service" or an "Emergency" application of the brakes. When the brake valve device is moved to "Release" position after either of these applications, the brake pipe 82 is again connected to the supply pipe 84, and the pressure therein immediately starts to build up. Each triple piston 264 then moves toward release position.

When the pressure in the brake pipe commences to build up, and reaches a value above that in the auxiliary reservoir great enough to move piston 264 to release position and to cause unseating of fast recharge valve 290, in each triple valve portion, fluid will flow from the brake pipe past this unseated valve, through passage 286, and port 284 in main slide valve 260, to slide valve chamber 258 and hence to the auxiliary reservoir connected thereto. The auxiliary reservoirs are thus charged more rapidly than is possible through the feed groove 420. Of course after the pressure in each auxiliary reservoir reaches a sufficiently high value the fast recharge valve 290 will be seated, and further charging of the auxiliary reservoir continues through the feed groove 420.

If it is desired to isolate the braking equipment on any one car from that on the others, this may be done by operation of a double cut-off cock 460. As may be seen in Figure 2, when the handle 461 of this device is in the position shown in full lines, each control valve device is connected to the brake cylinder and brake pipe on that car. When the handle 461 is moved to the position shown in dotted lines, the brake cylinder and brake pipe are disconnected from the control valve device.

While the operation of the embodiment illustrated has been described in connection with operation from one end only, it will be quite apparent from the foregoing description that the operation will be the same when controlled from the opposite end of the train, as the equipment on the rear end car is a duplicate of that on the front end car.

While we have illustrated and described one embodiment of our invention, it will be quite apparent to those skilled in the art that many changes therein and modifications thereof may be made, and we do not wish to be limited to the specific embodiments shown, or otherwise than by the spirit and scope of the appended claims.

Having now described our invention, what we claim as new and desire to secure by Letters Patent, is:

1. In a railway train brake system, the combination with a plurality of brake cylinders, and a brake pipe, of a control valve device for one or more units in the train, said control valve device having an electrically operated self-lapping portion, a relay valve portion, a triple valve portion, and an inshot valve portion, said relay valve portion controlling the supply of fluid under pressure to said brake cylinders, said self-lapping and triple valve portions controlling the pressure of the fluid supplied to operate the relay valve portion, and said inshot valve portion controlling the rate of flow of fluid to operate said relay valve portion, said triple valve portion being connected to said brake pipe and being operable upon a reduction in brake pipe pressure, and a brake valve device operable to control operation of said self-lapping portion and to effect reductions in brake pipe pressure.

2. In a vehicle brake system, the combination with a brake cylinder and a brake pipe, of a control valve device having an electrically operated self-lapping portion, a triple valve portion, and a magnet valve portion, said triple valve portion being connected to said brake pipe and being operable upon a reduction in brake pipe pressure, said control valve device controlling the flow of fluid under pressure to said brake cylinder, a brake valve device operable to control the operation of said self-lapping portion and to effect a reduction in brake pipe pressure, and a retardation controller device for controlling operation of said magnet valve portion.

3. In a fluid pressure brake system, the combination with a brake cylinder and a brake pipe, of a control valve device having an electrically operated self-lapping portion, a triple valve portion, and a magnet valve portion, said triple valve portion being connected to said brake pipe and being operated upon a reduction in brake pipe pressure, said control valve device controlling the flow of fluid to said brake cylinder, a brake valve device operable to control operation of said electrically operated self-lapping portion and to effect a reduction in brake pipe pressure, a retardation controller device operable according to the rate of retardation of the vehicle for controlling operation of said magnet valve portion, a circuit connecting said retardation controller device and magnet valve portion, and means for checking the integrity of said circuit.

4. In a fluid pressure brake system, the combination with a brake cylinder and a brake pipe, of a control valve device having an electrically controlled self-lapping portion, a triple valve portion, and a magnet valve portion, said triple valve portion being connected to said brake pipe and being operated upon a reduction in brake pipe pressure, said control valve device controlling the flow of fluid to said brake cylinder, a brake valve device operable to control the operation of said self-lapping portion and to effect a reduction in brake pipe pressure, a retardation controller device operable to control said magnet valve portion, and indicating means for indicating when said retardation controller device has operated.

5. In a fluid pressure brake system, the combination with a brake cylinder, a brake pipe, of a control valve device having an electro-pneumatically controlled valve portion and a triple valve portion, said triple valve portion being connected to said brake pipe and being operated upon a reduction in brake pipe pressure, said control valve device controlling the flow of fluid to said brake cylinder, a brake valve device having service positions for controlling operation of said electro-pneumatically controlled portion, electrically controlled valve means for effecting a reduction in brake pipe pressure, means responsive to a movement of said brake valve device to a service position for causing operation of said electrically controlled valve means to effect a reduction in brake pipe pressure, and means responsive to fluid supplied to said brake cylinder by operation of said electro-pneumatically controlled portion for preventing operation of said electrically controlled valve means.

6. In a fluid pressure brake system, the combination with a brake cylinder and a brake pipe, of a control valve device having an electrically controlled portion and a triple valve portion, said triple valve portion being connected to said brake pipe and being operated upon a reduction in brake pipe pressure, said control valve device controlling the flow of fluid to said brake cylinder, a source of current supply, a brake valve device operable to supply current from said source to said electrically controlled portion and to effect a reduction in brake pipe pressure, and a switch device responsive to brake pipe pressure for also controlling the supply of current from said source to said electrically controlled portion regardless of operation of said brake valve device.

7. In a train braking system, the combination with brake cylinders for one or more units in the train, of control valve devices for one or more units in the train, for controlling flow of fluid under pressure to said brake cylinders, a brake valve device for the head end of the train and a brake valve device for the rear end of the train, means for controlling operation of said control valve devices from either of said brake valve devices, means including a relay for the head end of the train and a relay for the rear end of the train for transferring the control of said control valve devices from one of said brake valve devices to the other of said brake valve devices, and means whereby when one of said brake valve devices is operated, one of said relays is energized and the other of said relays is de-energized.

8. In a train braking system, the combination with brake cylinders for one or more cars in the train, of control valve devices for one or more cars in the train, for controlling flow of fluid under pressure to said brake cylinders, means for controlling operation of said control valve devices from either end of the train to release fluid under pressure from said brake cylinders, said means including a plurality of electrical circuits extending throughout the train, and means for indicating at either end of the train the existence of faults in said circuits.

9. In a train braking system, the combination with a plurality of brake cylinders for one or more cars in the train, of a plurality of control valve devices for one or more cars in the train, a brake pipe, said control valve devices being connected to said brake pipe and being operable upon a reduction in brake pipe pressure, brake valve devices at the head end and rear end of said train and operable to control said control valve devices electro-pneumatically or by reduction of pressure in said brake pipe, retardation controller devices at the head end and rear end of said train and operable to also control operation of said control valve devices, means for transferring the control of said control valve devices by said brake valve devices and retardation control devices from one end of said train to the other, and indicating means for indicating at either end of said train the existence of irregular conditions in said brake system.

10. In a train braking system, the combination with a plurality of control valve devices for controlling application of the brakes, said control valve devices being operable electrically or by reductions in brake pipe pressure, of a brake valve device operable to control said control valve devices electrically or by reductions in brake pipe pressure, a retardation controller device operable to independently control release operations of said control valve devices after said devices have been caused to be operated by operation of said brake valve device, and means for indicating when said retardation controller device has operated.

11. A control valve device having an electrically controlled self-lapping portion, a relay valve portion, a triple valve portion, and an inshot valve portion, said relay valve portion being operable to control the flow of fluid under pressure supplied to effect an application of the brakes, said self-lapping and triple valve portions being operable to control the pressure of fluid supplied to operate said relay valve portion, and said inshot valve portion being operable to control the rate of flow of fluid to operate said relay valve portion.

12. A control valve device having an electrically controlled self-lapping portion, a relay valve portion, a triple valve portion, and a magnet valve portion, said relay valve portion being operable to control the flow of fluid supplied to produce an application of the brakes, said self-lapping and triple valve portions being operable to effect a supply of fluid under pressure to cause operation of said relay valve portion, and said magnet valve portion being operable to cut off the flow of fluid to said relay valve portion and to effect a release of fluid pressure supplied therefrom.

13. In a brake system, the combination with a supply reservoir, an auxiliary reservoir, a volume reservoir, and a brake cylinder, of a control valve device having an electrically controlled self-lapping portion, a relay valve portion, and a triple valve portion, said relay valve portion being operable to effect a supply of fluid under pressure from said supply reservoir to said brake cylinder, said self-lapping portion being operable to effect a supply of fluid under pressure from said supply reservoir to operate said relay valve portion, and said triple valve portion being operable to effect a supply of fluid under pressure from said auxiliary reservoir to operate said relay valve portion and to said volume reservoir.

14. In a vehicle brake system, in combination, brake means, an electrical relay, electroresponsive means responsive to denergization of said relay for effecting an emergency application of said brake means, a brake valve device having a release position and a plurality of service application positions, means associated with said brake valve device for maintaining said relay energized in release position of said brake valve device and operable to denergize said relay upon operation of said brake valve device to a predetermined service application position, means for effecting a service application of said brake means upon movement of said brake valve device to any service application position, and means responsive to a predetermined service application of said brake means for preventing said operation of said electroresponsive means.

15. In a vehicle brake system, in combination, a brake cylinder, a brake pipe, means operated upon a reduction in brake pipe pressure for supplying fluid under pressure to the brake cylinder, a brake valve device having a release position and a plurality of service positions, an electrical relay, means for energizing said relay when said brake valve device is in release position and for deenergizing said relay upon movement of said brake valve device to a predetermined service position, a magnet valve device operable when energized to effect a reduction in brake pipe pressure, a circuit adapted to be closed when said relay is deenergized to supply current to said magnet valve device, independent means for effecting a supply of fluid under pressure to said brake cylinder upon movement of said brake valve device to said predetermined service position, and a fluid pressure operated switch device responsive to brake cylinder pressure for opening the circuit to said magnet valve device at a predetermined brake cylinder pressure.

16. In a vehicle brake system, in combination, a brake cylinder, a brake pipe, means operative upon a reduction in brake pipe pressure for supplying fluid under pressure to said brake cylinder, a normally energized relay having contacts adapted to be closed after a predetermined delayed interval of time upon deenergization of said relay, an electrically operated valve device adapted to be energized upon closing of said contacts and operable when energized to effect a reduction in brake pipe pressure, means independent of said aforestated means for deenergizing said relay and for effecting a supply of fluid under pressure to said brake cylinder, and a switch device operated upon a predetermined brake cylinder pressure effected by said last means for preventing energization of said electrically operated valve device upon closing of said relay contacts.

17. In a vehicle brake system, in combination, brake means, electroresponsive means operable when energized to effect an application of said brake means, a main circuit for supplying current to said electroresponsive means, a by-pass circuit for also supplying current to said electroresponsive means, a brake valve device for connecting said main circuit to a source of current supply, normally open contacts in said by-pass circuit, a normally charged brake pipe, and means operated upon a reduction in brake pipe pressure for closing said contacts.

18. In a vehicle brake system, in combination, a brake pipe, a brake cylinder, means operative upon a reduction in brake pipe pressure for supplying fluid under pressure to said brake cylinder, a normally energized magnet valve device operable when deenergized to effect a reduction in brake pipe pressure, a normally closed circuit for maintaining said magnet valve device energized, normally closed contacts in said circuit, and an element adapted when pressure is applied thereto to open said contacts to deenergize said magnet valve device.

19. In a vehicle brake system, in combination, a brake cylinder, a brake valve device having a release position and a plurality of service positions and an emergency position, a brake pipe, means operative upon reduction in brake pipe pressure for supplying fluid under pressure to said brake cylinder, a normally energized magnet valve device operable when deenergized to effect a reduction in brake pipe pressure, means for deenergizing said magnet valve device, and means operative to reenergize said magnet valve device only upon movement of said brake valve device to emergency position.

20. In a vehicle brake system, in combination, a brake cylinder, a brake pipe, means operative upon a reduction in brake pipe pressure for supplying fluid under pressure to said brake cylinder, a magnet valve device operable when deenergized to effect a reduction in brake pipe pressure, means for momentarily energizing said magnet valve device, a holding circuit for maintaining said magnet valve device energized, and contacts operated when said magnet valve device is initially energized for closing said holding circuit.

21. In a train brake system, in combination, brake means for braking the train; a brake valve device for the head end of the train and a brake valve device for the rear end of the train, each of said brake valve devices having a release position, a plurality of application positions and a handle off position; a transfer relay for the head end of the train and a transfer relay for the rear end of the train; control apparatus for the head end of the train and control apparatus for the rear end of the train, the control apparatus at either end of the train being effective when the transfer relay at that end is energized and being ineffective when the transfer relay at that end is deenergized; means for maintaining the transfer relay at the head end of the train energized when the brake valve device at the head end of the train is in release position or in any application position; and means for maintaining the transfer relay at the rear end of the train deenergized when the brake valve device at the rear end of the train is in handle off position.

22. In a train brake system, in combination, brake means for braking the train, a plurality of electroresponsive means for controlling operation of said brake means, a supply conductor extending throughout the train for supplying current to said electroresponsive means, a return conductor extending throughout the train for the return of current supplied to said electroresponsive means, a source of current supply having an ungrounded terminal and a grounded terminal, control means for connecting said ungrounded terminal to said supply conductor, and means for grounding said return conductor at or near the middle of the train to provide a return path for the current to said grounded terminal, whereby undesired energization of said electroresponsive means is prevented.

23. In a vehicle brake system, the combination with a brake cylinder and a supply reservoir, of a relay valve device for controlling the supply of fluid under pressure from said reservoir to said brake cylinder, a brake pipe, an automatic valve mechanism operated according to reductions of pressure in said brake pipe for controlling operation of said relay valve device, and a brake valve device operable to effect reductions in brake pipe pressure at either a service rate or an emergency rate.

24. In a vehicle brake apparatus, the combination with a brake cylinder and a supply reservoir, of a relay valve device for controlling the supply of fluid under pressure from said reservoir to said brake cylinder, a brake pipe, an automatic valve mechanism operated according to reductions in brake pipe pressure for controlling operation of said relay valve device, a brake valve device operable to effect reductions in brake pipe pressure at either a service rate or an emergency rate, and an emergency valve device operable only upon reductions in brake pipe pressure at an emergency rate for reducing brake pipe pressure to atmospheric pressure.

25. In a brake equipment for vehicles, a brake cylinder, a magnet valve device for controlling the supply of fluid under pressure to said brake cylinder, an automatic valve device for controlling the supply of fluid under pressure to said brake cylinder, a manually operable brake valve device for simultaneously controlling the operation of said magnet valve device and of said automatic valve device, and means responsive to a reduction in brake pipe pressure for effecting the operation of said magnet valve device to apply the brakes independently of the operation of said manually operable brake valve device.

26. In a railway train brake system, the combination with a brake cylinder, an auxiliary reservoir, and a supply reservoir, of valve means operable by fluid under pressure for controlling the supply of fluid under pressure from said supply reservoir to said brake cylinder, means for electropneumatically effecting a supply of fluid under pressure from said supply reservoir to operate said valve means, and means for pneumatically effecting a supply of fluid under pressure from said auxiliary reservoir to operate said valve means.

27. In a railway train brake system, the combination with a brake cylinder, an auxiliary reservoir, and a supply reservoir, of valve means operable by fluid under pressure for controlling the supply of fluid under pressure from said supply reservoir to said brake cylinder, means for electropneumatically effecting a supply of fluid under pressure from said supply reservoir to operate said valve means, means for pneumatically effecting a supply of fluid under pressure from said auxiliary reservoir to operate said valve means, and means operable when fluid is supplied from one of said reservoirs for effecting a lapping of the supply.

28. In a train braking apparatus, the combination with a brake cylinder; of a control valve device having contained therein a plurality of separate application and release magnet valve sections, a triple valve section and a relay valve section, said relay valve section controlling the supply of fluid under pressure to and its release from said brake cylinder, each of said magnet valve sections and said triple valve section controlling fluid under pressure supplied to operate said relay valve section; means for controlling one of said magnet valve sections and said triple valve section in accordance with a desired degree of braking; and means governed by the rate of retardation for controlling the other of said magnet valve sections.

29. In a train braking apparatus, the combination with a brake cylinder; of a control valve device having contained therein a plurality of separate application and release magnet valve sections, a triple valve section, an inshot valve section, and a relay valve section, said relay valve section controlling the supply of fluid under pressure to and its release from said brake cylinder, each of said magnet valve sections, said inshot valve section, and said triple valve section controlling fluid under pressure supplied to operate said relay valve section; means for controlling one of said magnet valve sections and said triple valve section in accordance with a desired degree of braking; and means governed by the rate of retardation for controlling the other of said magnet valve sections.

30. In a train brake system, in combination, a brake cylinder, a brake pipe, a supply reservoir, an auxiliary reservoir, a volume reservoir, a relay valve device for controlling the supply of fluid under pressure from said supply reservoir to said brake cylinder, means operable to control supply of fluid under pressure from said supply reservoir to operate said relay valve device, and an automatic valve device operated upon a reduction in brake pipe pressure for effecting a supply of fluid under pressure from said auxiliary reservoir to both said volume reservoir and to said relay valve device.

31. In a train brake system, the combination with a brake cylinder, of a valve device operated upon the supply of fluid under pressure thereto for controlling the supply of fluid under pressure to and its release from said brake cylinder, means for establishing a communication through which fluid under pressure is supplied to operate said relay valve device, a second valve device having a chamber and operable at a chosen pressure of fluid supplied to said chamber to control communication between said chamber and said first communication, an electrically controlled self-lapping valve device operable to control a supply of fluid under pressure to said chamber, and an automatic valve device operable to control another supply of fluid under pressure to said chamber.

32. In a train brake system, the combination with a brake cylinder, of a relay valve device operated upon the supply of fluid under pressure thereto for controlling the supply of fluid under pressure to and its release from said brake cylinder, means for establishing a communication through which fluid under pressure is supplied to operate said relay valve device, a second valve device having a chamber and operable at a chosen pressure of fluid supplied to said chamber to control communication between said chamber and said first communication, a supply reservoir, an electrically operated self-lapping magnet valve device operable to control a supply of fluid under pressure from said supply reservoir to said chamber, an auxiliary reservoir, a brake pipe, and an automatic valve device operated upon a reduction in brake pipe pressure for controlling the supply of fluid under pressure from said auxiliary reservoir to said chamber.

33. In a train brake system, the combination with a brake cylinder, of a relay valve device operated upon the supply of fluid under pressure thereto for controlling the supply of fluid under pressure to and its release from said brake cylinder, means establishing a communication through which fluid under pressure is supplied to operate said relay valve device, a second valve device having a chamber and operable to control communication between said chamber and said first communication, a supply reservoir, an electrically operated self-lapping magnet valve device operable to control a supply of fluid under pressure from said supply reservoir to said chamber, an auxiliary reservoir, a volume reservoir, a brake pipe, and an automatic valve device operated upon a reduction in brake pipe pressure for effecting a supply of fluid under pressure from said auxiliary reservoir to said chamber and to said volume reservoir.

34. In a train brake system, the combination with a brake cylinder, of a relay valve device controlling the supply of fluid under pressure to said brake cylinder, an electrically controlled self-lapping valve device operable to effect a supply of fluid under pressure to said relay valve device according to the energization thereof, a brake pipe, an automatic valve device operated upon reductions in brake pipe pressure for also effecting a supply of fluid under pressure to said relay valve device, a selective valve device controlling supply to said relay valve device and operable to select the supply of greater pressure, and a brake valve device operable to control the degree of energization of said self-lapping valve device and operable to effect reductions in brake pipe pressure.

35. In a railway train brake equipment, the combination with a brake cylinder, of a control valve device having electromagnetically operated valves and pneumatically operated valves, for controlling the supply of fluid under pressure to and its release from said brake cylinder, a brake valve device for controlling operation of said pneumatically operated valves and certain of said electromagnetically operated valves, and retardation control means for controlling the other of said electromagnetically operated valves.

CLYDE C. FARMER.
ELLIS E. HEWITT.